(12) United States Patent
Coates

(10) Patent No.: US 11,700,058 B2
(45) Date of Patent: Jul. 11, 2023

(54) SYSTEM FOR WIRELESS COMMUNICATION USING GERMICIDAL LIGHT FREQUENCIES

(71) Applicant: FAR UV Innovations, Inc., Clearwater, FL (US)

(72) Inventor: John Coates, Clearwater, FL (US)

( * ) Notice: Subject to any disclaimer, the term of this patent is extended or adjusted under 35 U.S.C. 154(b) by 110 days.

(21) Appl. No.: 17/497,011

(22) Filed: Oct. 8, 2021

(65) Prior Publication Data

US 2023/0115105 A1   Apr. 13, 2023

(51) Int. Cl.
*H04B 10/114*   (2013.01)
(52) U.S. Cl.
CPC ..... *H04B 10/1149* (2013.01); *H04B 10/1143* (2013.01)
(58) Field of Classification Search
CPC .................. H04B 10/1149; H04B 10/1143
See application file for complete search history.

(56) References Cited

U.S. PATENT DOCUMENTS

| | | | |
|---|---|---|---|
| 11,426,478 B1* | 8/2022 | D'Angelo, Jr. ........... | A61L 2/24 |
| 2021/0215319 A1* | 7/2021 | Raring ...................... | A61L 2/10 |
| 2022/0118148 A1* | 4/2022 | Shatalov ............. | F21V 33/0096 |
| 2023/0014295 A1* | 1/2023 | Davis ........................ | F24F 3/16 |
| 2023/0042650 A1* | 2/2023 | Ross ........................ | A61L 2/10 |
| 2023/0050177 A1* | 2/2023 | Grieder ................. | H01S 5/4012 |

\* cited by examiner

*Primary Examiner* — Mina M Shalaby
(74) *Attorney, Agent, or Firm* — Larson & Larson; Justin P. Miller; Frank Liebenow

(57) ABSTRACT

Wireless communication using germicidal light frequencies is a system and method for transmitting and receiving data using Far-UVC light. The system communicates data using Far-UVC light of a germicidal wavelength. Far UV is a specific spectrum of UV light. The ultraviolet spectrum is a band of electromagnetic radiation with higher energy, thus shorter wavelengths, than visible light. With respect to this system, the UV light wavelengths of interest are Far-UVC for solar-blind data-carrying frequencies in the THz range to provide a UVGI function.

14 Claims, 3 Drawing Sheets

SYSTEM FOR WIRELESS COMMUNICATION USING GERMICIDAL LIGHT FREQUENCIES

FIELD

This invention relates to the fields of communication and sanitization and more particularly to a system for communicating wirelessly using sterilizing light.

BACKGROUND

The COVID-19 pandemic has prompted a reevaluation of what makes indoor environments safe for living and working.

While all occupied spaces are of concern, in particular, office environments have become a focus because of their potential for spreading viruses. Office workers come together during business hours, often working in close proximity, and then separate during off-hours. During off-hours the workers see their family, friends, fellow commuters, and so forth, potentially coming into contact with contagions that they bring back to the office.

The result is an office environment with the possibility of sharing viruses.

A similar situation exists in schools, with children gathering together during the day and separating at night. The problem is compounded by a child's still-developing hygiene skills, increasing the risk of spreading pathogens.

Air sterilization using UV light is known, generally installed within the air handler of a central HVAC system. Given its central, hidden location, the air is only sanitized after it has been drawn in and passed by the light. With the standard of four air changes per hour, contaminated air waits at least fifteen minutes to be sterilized, and this measurement ignores the circulation dead zones where air fails to be drawn into the HVAC system.

Fifteen minutes is ample time to pass a virus from one worker to another, thus creating a need for sterilization of air around users.

The appeal of adding a sterilization system to an office is increased when it can accomplish multiple purposes, for example, data communication.

With the rise of flexible office spaces, and the increasing speeds of data communication, there is a concurrent need for the wireless transmission of data while avoiding the already-crowded radio-frequency spectrum.

What is needed is a system for communicating data using light, the light acting to sanitize an occupied space.

SUMMARY

The system for wireless communication using germicidal light frequencies is a system and method for transmitting and receiving data using light while simultaneously sterilizing air. The system communicates data using light of a germicidal frequency. Specifically, a wavelength and data frequency in a narrow band of the electromagnetic spectrum commonly referred to as Far UVC Far UVC is a specific spectrum of ultraviolet (UV) light. The ultraviolet spectrum is a band of electromagnetic radiation with a higher energy, thus shorter wavelengths, than visible light.

With respect to this system, the UV light wavelengths and data-bearing frequencies of interest are known as active personnel ultraviolet germicidal irradiation (AP-UVGI) located in the Far-UVC portion of the electromagnetic spectrum, defined as 200-230 nm, which is a subset of wavelength spectrum known as UVC, defined as 200-280 nm. Far UV-C defined as 200-230 nm, located between UV-B, defined as 280-315 nm, and vacuum-UV, defined as VUV, at 100-200 nm.

The preferred band of frequencies for communication is a 23 nm band, within FAR UV-C 207-230 nanometer wavelengths, utilizing communication frequencies between 1448.27 terahertz (THz) and 1303.44 THz. Ideally, the preferred frequencies are biased toward the 207 nm wavelengths because the lower frequencies may exceed safe thresholds for human exposure in occupied spaces. A preferred ideal human-safe germicidal frequency bandwidth for communications is between 1448-1332 THz, where peak transmission power centers near 1,369 THz with a peak photon energy ideally above 5.51 eV (225 nm) and below 5.84 eV (212 nm). This frequency range is unique because it sanitizes air and surfaces while being unable to penetrate the nucleus of living skin and eye cells. Thus, it is safe for continuous exposure at the levels required to sanitize air and surfaces.

This is unlike radio waves, which damage tissues and may serve as a catalyst to alter DNA. The concern about limiting exposure to radio waves has resulted in Specific Absorption Rate (SAR) limitations set by the Federal Communications Commission (FCC). Despite these limitations, concerns remain that exposure to radiation that penetrates the skin deep into the body may result in cellular damage. Thus, the ability to transmit data without penetrating the skin—creates a zero-SAR, communications device, an RF safe solution— is of great interest.

The Far UVC band is also ideal for communication due to the low risk of interference. Prior art light communication systems used frequencies that are subject to interference, including solar radiation from the sun.

This makes prior art systems susceptible to events such as solar flares, reducing reliability and efficiency. Users will not tolerate low data speeds in an office environment due to events such as solar flares. Prior art systems using longer wavelengths of solar-blind UV may penetrate window covering and travel outside a secure zone. Military applications using germicidal communications won't need to cover thin windows used by a mobile command unit and will utilize frequencies of the highest levels of atmospheric absorption while remaining within guidelines for detectable ozone levels before transmitting sensitive data to limit unauthorized access from an unobstructed line of sight view to a germicidal communications network component.

The Far-UVC wavelengths are not susceptible to solar interference because any Far-UVC light that originates from outside Earth is filtered out by the ozone layer. Thus, any Far-UVC light in an office environment is from an artificial source.

In order to encode data within germicidal light, the light is modulated. Stated differently, the outgoing signal data is superimposed onto the light. The intensity, frequency, phase, and polarization of the carrier light waves is modulated by the signals.

This work is performed by the processing circuitry on the transmission end of the system.

The data encoded light then passes through the environment, sterilizing the intervening air and surfaces over an allotted time relative to the AP-UVGI dosage required. The light that is not absorbed by bio-agents and the environment then reaches the photodetector, where the incoming data is demodulated, the output being the data signal created from invisible solar-blind far UV-C light that escaped absorption.

In addition, integrating AI machine learning algorithms into germicidal wireless communication processes opens the full potential of next-generation Far UVC THz wireless IoT networks with real-time adjustments to output power and frequency depending on ever-changing bio-agent threat conditions without harm to humans.

Anticipated modulation methodologies include:
On-off keying (OOK);
pulse position modulation (PPM);
fixed-length digital pulse interval modulation (FDPIM); and
digital pulse interval modulation (DPIM).

The use of Far-UVC light has the additional benefit of greater security as compared to the use of radio waves. Specifically, the Far-UVC frequencies are ideal for secure, indoor environments because the light cannot leave the building. Walls are opaque to light, and thus block escape. Modern windows include UV-blocking films to reduce UV exposure from the sun. These same films and normal non-quartz glass impurities filter out the solar-blind spectrum of Far-UVC light used by the disclosed system, preventing devices outside the building from "overhearing" the transmissions.

Additionally, even outdoor environments are more secure. The Far-UV-C light used in the embodiment of germicidal communications drops off quickly as it begins to interact with ambient atmospheric conditions, thus transmission distance is short. This reduces the ability of a third-party to sit away from the transmission site and receive data beyond this distance. The synergy of this system is the combination of data communication with sterilization because the Far-UV band of light acts to sterilize the air and surfaces against microbes.

The efficacy of the sterilization effect is governed by two key parameters: wavelength and total UV exposure—referred to as UV dose or fluence. Wavelengths below 230 nm are highly effective for sterilization because the photons are readily absorbed by nucleic acids and proteins inside nano-sized bioagents, which results in photochemical damage to both biomolecule types. Thus, there are two pathways to the inactivation of microorganisms and viruses.

To accomplish this combination of data transmission and sanitization, hardware is required. Specifically, in the preferred embodiment the light source is a solid-state, Far-UV light-emitting diode (LED) to emit Far-UV light encoded with data.

The preferred LED emitter is AlGaN-based because of its high modulation rate and small chip size. Multiple LEDs can be packaged into a single array, creating output power that is measured in Watts.

In alternative embodiments, the light source is a Nitride-Semiconductor based emitter, Nano-rod LED, micro-LED, or a combined frequency doubling technique using lasers for second harmonic generation (SHG) to reach the desired Far-UV light frequency for germicidal communication.

The input to the light source is the output of a control unit, the output of the control unit including a signal modulated to include encoded data.

The receiver is a photodetector that converts the modulated light into a signal, the signal decoded to result in the transmitted data.

In addition to data as input to the control system, additional hardware can measure the office environment, adjusting the light output to best accomplish the dual purposes of sanitization and data communication.

Stated differently, the system for wireless communication using germicidal light can use environmental parameters as feedback for determining the ideal strength and frequency of Far UV light transmission.

Environmental inputs can include:
Number of receiving devices;
Measurement of particulate density in the air;
Number of occupants in the space;
Time of day;
Humidity;
Carbon-dioxide concentration as a proxy for user's breathing (e.g., a gym may need to scale up more as occupants engage in activities with more breathing)
Ozone in the air; and
Other means of determining risk.

The environmental inputs are used as feedback to the controller, which can then increase the amplitude of the emitted light if needed to accommodate for a higher number of occupants, increased humidity, or higher particulate density. And the controller can decrease amplitude when user load drops, or if ozone concentration rises, for example.

The receiving hardware can determine the strength, or amplitude, of the light it receives, then returning this information during its responsive transmission. This data is then incorporated by the transmission hardware, which can increase or decrease the amplitude of its emitted light to compensate.

The system for wireless communication using germicidal light frequencies is versatile, able to be installed in:
Buildings;
Vehicles, both public and private;
Homes;
Medical facilities; and
Occupied spaces.

The discussion now turns to a description of the preferred embodiment.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
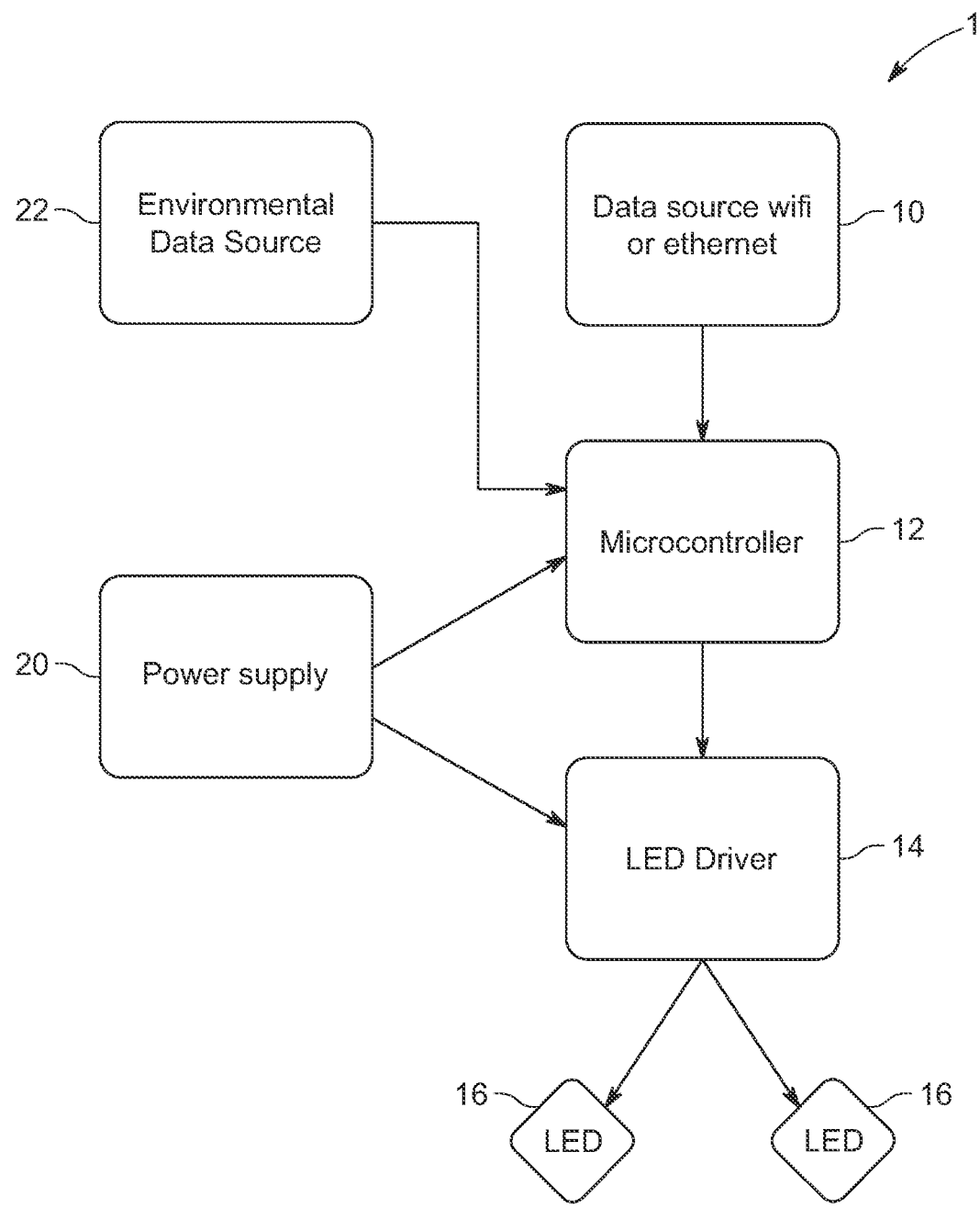
FIG. 1 illustrates a schematic view of the transmitting components of the Far UVC communication system.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of the transmitting components of the Far UVC communication system is shown.

The system for wireless communication using germicidal light frequencies 1 includes data input and output via a data source 10. The data source 10 connects to the microcontroller 12, which also receives input from environmental data source 22.

The microcontroller 12 feeds into the driver 14, which in turn controls the one or more light sources 16.

The microcontroller 12 and the driver 14 are both powered by the power supply 20.

Figure 2:
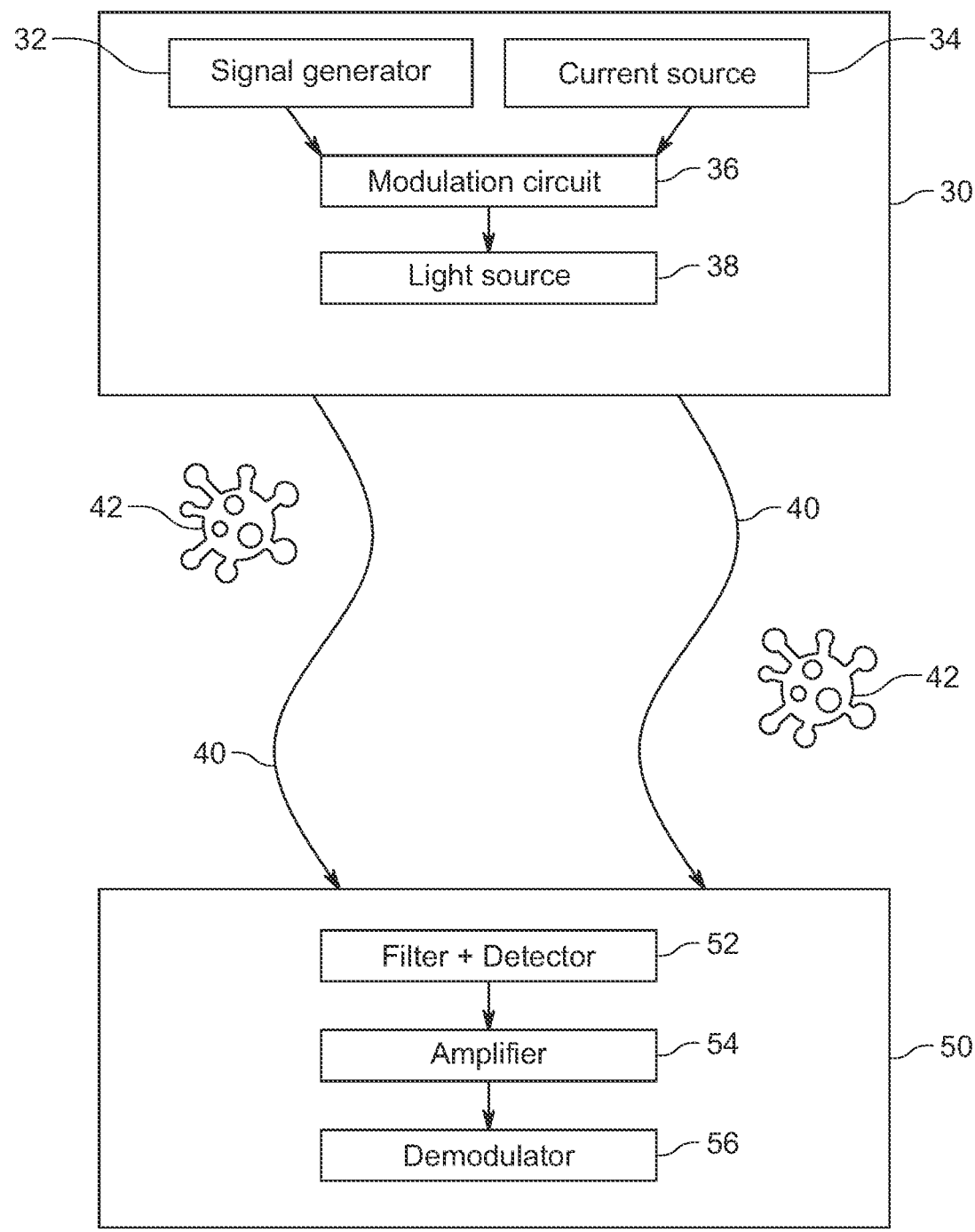
FIG. 2 illustrates a schematic view of the system overall of the Far UVC communication system.

Referring to FIG. 2, a schematic view of the system overall of the Far UVC communication system is shown.

In this figure, both the transmission hardware and receiving hardware are shown. The transmission and receiving hardware can be combined to create units that both send and receive data via Far UV light.

The transmitting hardware 30 includes a signal generator 32 and power source 34, both of which feed into the modulation circuit 36.

The modulation circuit 36 connects to the light source 38.

The light 40 exiting the transmitting hardware 30 comes into contact with pathogens 42, which are neutralized.

The light 40 then reaches the receiving hardware 50, which includes a light filter and detector 52, followed by an amplifier 54 and demodulator 56.

Figure 3:
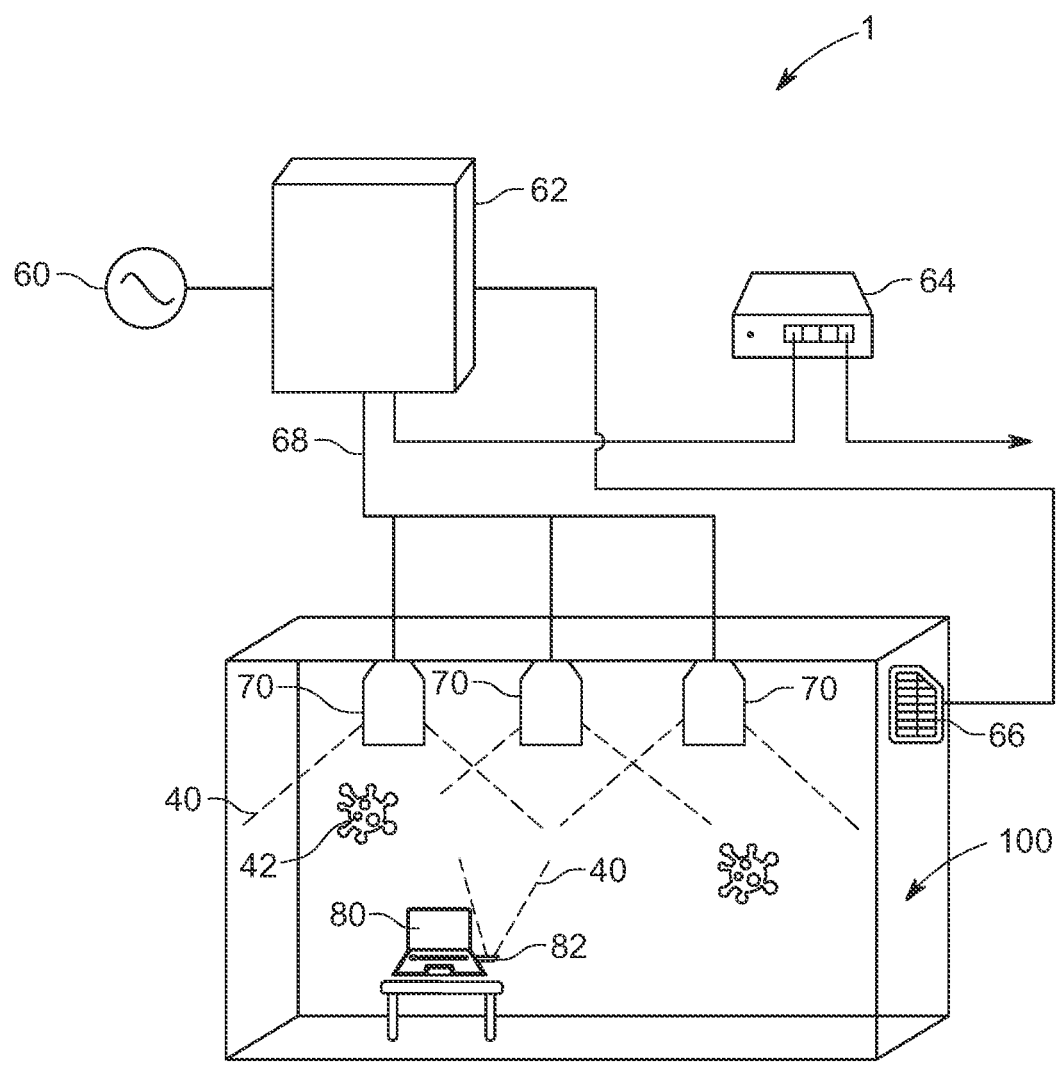
FIG. 3 illustrates a schematic view, in an office environment, of the Far UVC communication system.

Referring to FIG. 3, a schematic view, in an office environment, of the Far UVC communication system is shown.

A power supply 60 feeds the power and signal management equipment 62, which acts to combine the data from the network equipment 64 and environmental monitoring equipment 66, determining how to best combine the environmental data and information for transmission into Far-UVC light transmission.

Signals are passed over the wiring 68 to one or more fixed transmission and receiving fixtures 70.

Emitted light 40 passes around the interior space 100, contacting and neutralizing pathogens 42, then reaching the portable transmission and receiving fixture 82 of the computer 80.

The transmitting hardware 30 and receiving hardware 50 described in FIG. 2 are packaged into the portable transmission and receiving fixture 82, which can receive the Far-UVC light and interpret the encoded data.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device for transmitting data while sanitizing air, the device including:
    transmitting hardware with one or more light sources;
        the transmitting hardware encoding incoming data into a signal;
        the signal controlling the one or more light sources;
        the one or more light sources emitting light into a space, the light having a wavelength in a Far-UVC spectrum;
        the light carrying data;
        the light sanitizing air and surfaces within the space;
    environmental monitoring equipment;
        the environmental monitoring equipment monitoring conditions of the air, including particulate density and humidity;
        the environmental monitoring equipment transmitting to the transmitting hardware, the transmitting hardware adjusting an amplitude of the light to compensate for conditions of the air;
    whereby the device simultaneously transmits data and sanitizes the space, while being safe for human exposure in spaces continuously occupied by people.

2. The device for transmitting data while sanitizing air of claim 1, further comprising:
    receiving hardware;
        the receiving hardware including a light detector, the light detector receiving the light and creating an output signal;
        the light detector passing the output signal to a demodulator, the demodulator converting the output signal into data;
    whereby the receiving hardware converts light into electrical signals, thus allowing a computing device to interpret the data encoded in the light.

3. The device for transmitting data while sanitizing air of claim 1, wherein the Far-UVC spectrum is defined as wavelengths of 200 nm to 230 nm.

4. The device for transmitting data while sanitizing air of claim 1, wherein the Far-UVC spectrum is defined as wavelengths of 207 nm to 230 nm.

5. The device for transmitting data while sanitizing air of claim 2, wherein the Far-UVC spectrum is defined as wavelengths of 207 nm to 230 nm.

6. A device that uses light to simultaneously transmit data wirelessly across a space while sanitizing the space, the space filled with air, the device comprising:
    transmitting hardware;
        the transmitting hardware having two or more inputs, the two or more inputs including information for transmission and environmental data;
        environmental data including data about conditions within the space;
        the transmitting hardware encoding the information for transmission into Far-UVC light for transmission;
        the transmitting hardware adjusting an amplitude of the Far-UVC light based on the environmental data;
        the light having a wavelength in a Far-UVC spectrum;
    whereby the device transmits data across the space, while adjusting intensity of the light to adapt to conditions within the space, the light unable to pass through human skin.

7. The device that uses light to simultaneously transmit data wirelessly across a space and sanitize the space of claim 6, further comprising:
    receiving hardware;
        the receiving hardware including a light detector, the light detector receiving the light and creating an output signal;
        the light detector passing the output signal to a demodulator, the demodulator converting the output signal into data;
    whereby the receiving hardware converts light into electrical signals, thus allowing a computing device to interpret the data encoded in the light.

8. The device that uses light to simultaneously transmit data wirelessly across a space and sanitize the space of claim 6, further comprising:
    receiving hardware;
        the receiving hardware including a light detector, the light detector receiving light and creating an output signal;

the light detector passing the output signal to a demodulator, the demodulator converting the output signal into data;

whereby the receiving hardware converts light into electrical signals, thus allowing a computing device to interpret the data encoded in the light.

9. The device that uses light to simultaneously transmit data wirelessly across a space and sanitize the space of claim 6, wherein the Far-UVC spectrum is defined as wavelengths of 200 nm to 230 nm.

10. The device that uses light to simultaneously transmit data wirelessly across a space and sanitize the space of claim 6, wherein the Far-UVC spectrum is defined as wavelengths of 207 nm to 230 nm.

11. The device that uses light to simultaneously transmit data wirelessly across a space and sanitize the space of claim 9, wherein the Far-UVC spectrum is defined as wavelengths of 207 nm to 230 nm.

12. The device that uses light to simultaneously transmit data wirelessly across a space and sanitize the space of claim 6, further comprising:

environmental monitoring equipment;
the environmental monitoring equipment monitoring conditions of the air, including particulate density and humidity;
the environmental monitoring equipment transmitting to the transmitting hardware, the transmitting hardware adjusting an amplitude of the light to compensate for conditions of the air.

13. A system for wireless communication while sterilizing air, the system using transmitting hardware to encode data within emitted Far-UVC light, the emitted Far-UVC light having a wavelength of within a band of a Far-UV spectrum of 207 nm to 230 nm, with a peak power at a wavelength of between 207 nm and 225 nm, the emitted Far-UVC light at power levels unable to penetrate human skin and thus safe for continuous cycles of intermittent human exposure, the system further comprising:

environmental monitoring equipment;
the environmental monitoring equipment monitoring conditions of the air, including particulate density and humidity;
the environmental monitoring equipment communicating with the transmitting hardware, the transmitting hardware adjusts the emitted Far-UVC light to compensate for conditions of the air.

14. The system for wireless communication while sterilizing air of claim 13, the system further comprising:

receiving hardware;
the receiving hardware including a light detector, the light detector receiving the emitted Far-UVC light and creating an output signal;
the light detector passing the output signal to a demodulator, the demodulator converting the output signal into data;
whereby the receiving hardware converts Far-UVC light into electrical signals, thus allowing a computing device to interpret the data encoded in the emitted Far-UVC light.

* * * * *